(12) United States Patent
Imai et al.

(10) Patent No.: US 11,215,137 B1
(45) Date of Patent: Jan. 4, 2022

(54) ENGINE DEVICE (71) Applicant: TOYOTA JIDOSHA KABUSHIKI KAISHA, Aichi-ken (JP)

(72) Inventors: Sohichi Imai, Toyota (JP); Shigeki Nakayama, Toyota (JP); Masanao Idogawa, Toyota (JP); Daigo Ando, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/329,150

(22) Filed: May 25, 2021

(30) Foreign Application Priority Data

Jun. 15, 2020 (JP) .............................. JP2020-102774

(51) Int. Cl.
*F02D 41/14* (2006.01)
*F02D 43/04* (2006.01)

(52) U.S. Cl.
CPC ......... *F02D 43/04* (2013.01); *F02D 41/1447* (2013.01); *F02D 2200/0802* (2013.01); *F02D 2200/0804* (2013.01)

(58) Field of Classification Search
CPC ..................... F02D 41/1447; F02D 2200/0804
USPC ......................... 701/103; 73/114.69; 123/676
See application file for complete search history.

(56) References Cited

U.S. PATENT DOCUMENTS

| | | | |
|---|---|---|---|
| 2002/0005064 A1* | 1/2002 | Ohkuma | F02D 41/1496 73/114.74 |
| 2010/0312451 A1* | 12/2010 | Karnik | F01N 3/10 701/102 |
| 2015/0032390 A1* | 1/2015 | Adachi | G01M 15/102 702/50 |
| 2016/0169168 A1* | 6/2016 | Hanawa | F02M 26/46 123/568.12 |
| 2017/0089284 A1* | 3/2017 | Miura | F01N 3/20 |
| 2018/0347435 A1* | 12/2018 | Daniels | F02P 5/1512 |

FOREIGN PATENT DOCUMENTS

JP 2013238147 A 11/2013

* cited by examiner

*Primary Examiner* — Erick R Solis
(74) *Attorney, Agent, or Firm* — Hauptman Ham, LLP (57) ABSTRACT

In an engine device, when executing normal control that performs fuel injection and ignition as control of an engine, a controller estimates, in the case of a stoichiometric air-fuel ratio, an exhaust gas temperature based on first thermal energy that is based on a combustion gas temperature, a combustion gas quantity, and specific heat of combustion gas, estimates, in the case of a lean air-fuel ratio, the exhaust gas temperature based on the first thermal energy and second thermal energy that is based on an air temperature, a surplus air quantity, and specific heat of air, and estimates, in the case of a rich air-fuel ratio, the exhaust gas temperature based on the first thermal energy and third thermal energy that is based on a fuel temperature, a surplus fuel quantity, specific heat of fuel, and evaporation latent heat of fuel.

7 Claims, 7 Drawing Sheets

ENGINE DEVICE

CROSS-REFERENCE TO RELATED APPLICATION

This application claims priority to Japanese Patent Application No. 2020-102774 filed on Jun. 15, 2020, incorporated herein by reference in its entirety.

BACKGROUND

1. Technical Field

The present disclosure relates to an engine device.

2. Description of Related Art

As an engine device of this type, a device configured to estimate exhaust gas temperature by using parameters has conventionally been proposed, the parameters including a cylinder gas temperature at the time of a bottom dead center of an engine, a fuel injection quantity, an engine speed, the quantity of a cylinder intake gas that is taken into a combustion chamber, and specific heat of air (see, for example, Japanese Patent Application Publication No. 2013-238147).

SUMMARY

The aforementioned engine device can accurately estimate the exhaust gas temperature when an air fuel ratio is stoichiometric. However, when the air fuel ratio is lean or rich, i.e., when air or fuel is surplus with respect to the case of the stoichiometric air fuel ratio, the exhaust gas temperature may be estimated less accurately.

A primary object of the engine device of the present disclosure is to accurately estimate exhaust gas temperature in the case of a lean or rich air fuel ratio, in addition to the case of a stoichiometric air fuel ratio.

The engine device of the present disclosure adopts following means in order to accomplish the aforementioned primary object.

An engine device of the present disclosure includes an engine and a controller. The engine includes an intake port, a combustion chamber, and an exhaust port. The controller is configured to control the engine, and estimate an exhaust gas temperature that is a temperature of exhaust gas discharged from the combustion chamber and flowing through the exhaust port. When executing normal control that performs fuel injection and ignition as control of the engine, the controller is configured to estimate the exhaust gas temperature based on first thermal energy in the case of a stoichiometric air-fuel ratio, the first thermal energy being based on a combustion gas temperature, a combustion gas quantity, and specific heat of combustion gas, estimate the exhaust gas temperature based on the first thermal energy and second thermal energy in the case of a lean air-fuel ratio, the second thermal energy being based on an air temperature, a surplus air quantity with respect to the case of the stoichiometric air-fuel ratio, and specific heat of air, and estimate the exhaust gas temperature based on the first thermal energy and third thermal energy in the case of a rich air-fuel ratio, the third thermal energy being based on a fuel temperature, a surplus fuel quantity with respect to the case of the stoichiometric air-fuel ratio, specific heat of fuel, and evaporation latent heat of fuel.

When executing normal control that performs fuel injection and ignition as control of the engine, the engine device of the present disclosure may be configured to estimate the exhaust gas temperature based on first thermal energy in the case of a stoichiometric air-fuel ratio, the first thermal energy being based on a combustion gas temperature, a combustion gas quantity, and specific heat of combustion gas, estimate the exhaust gas temperature based on the first thermal energy and second thermal energy in the case of a lean air-fuel ratio, the second thermal energy being based on an air temperature, a surplus air quantity with respect to the case of the stoichiometric air-fuel ratio, and specific heat of air, and estimate the exhaust gas temperature based on the first thermal energy and third thermal energy in the case of a rich air-fuel ratio, the third thermal energy being based on a fuel temperature, a surplus fuel quantity with respect to the case of the stoichiometric air-fuel ratio, specific heat of fuel, and evaporation latent heat of fuel. Hence, the exhaust gas temperature can accurately be estimated in the case of the lean air-fuel ratio (air is surplus with respect to the case of the stoichiometric air-fuel ratio) and the case of the rich air-fuel ratio (fuel is surplus with respect to the case of the stoichiometric air-fuel ratio), in addition to the case of the stoichiometric air-fuel ratio.

In the engine device of the present disclosure, when executing the normal control as the control of the engine, the controller may be configured to estimate the exhaust gas temperature by dividing the first thermal energy by first thermal capacity in the case of the stoichiometric air-fuel ratio, the first thermal energy being obtained as a product of the combustion gas temperature, the combustion gas quantity, and the specific heat of combustion gas, the first thermal capacity being obtained as a product of the combustion gas quantity and the specific heat of combustion gas, estimate the exhaust gas temperature by dividing a sum of the first thermal energy and the second thermal energy by a sum of the first thermal capacity and second thermal capacity in the case of the lean air-fuel ratio, the second thermal energy being obtained as a product of the air temperature, the surplus air quantity, and the specific heat of air, the second thermal capacity being obtained as a product of the surplus air quantity and the specific heat of air, and estimate the exhaust gas temperature by dividing a sum of the first thermal energy and the third thermal energy by a sum of the first thermal capacity and third thermal capacity in the case of the rich air-fuel ratio, the third thermal energy being obtained by subtracting a product of the surplus fuel quantity and the evaporation latent heat of fuel from a product of the fuel temperature, the surplus fuel quantity, and the specific heat of fuel, the third thermal capacity being obtained as a product of the surplus fuel quantity and the specific heat of fuel.

In the engine device of the present disclosure, when executing non-ignition injection control that performs the fuel injection without performing the ignition as the control of the engine, the controller may be configured to estimate the exhaust gas temperature based on the second thermal energy and the third thermal energy, the second thermal energy being obtained by using the quantity of air passing through the combustion chamber and flowing to the exhaust port as the surplus air quantity, the third thermal energy being obtained by using the fuel injection quantity as the surplus fuel quantity. With the above configuration, when non-ignition injection control is executed, the exhaust gas temperature can accurately be estimated.

In this case, when executing the non-ignition injection control as the control of the engine, the controller may be configured to estimate the exhaust gas temperature by dividing a sum of the second thermal energy and the third thermal energy by a sum of the second thermal capacity and the third thermal capacity, the second thermal energy being obtained as a product of the air temperature, the surplus air quantity, and the specific heat of air, the third thermal energy being obtained by subtracting a product of the surplus fuel quantity and the evaporation latent heat of fuel from a product of the fuel temperature, the surplus fuel quantity, and the specific heat of fuel, the second thermal capacity being obtained as a product of the surplus air quantity and the specific heat of air, the third thermal capacity being obtained as a product of the surplus fuel quantity and the specific heat of fuel.

In the engine device of the present disclosure, when executing fuel cut control that does not perform the fuel injection and the ignition as the control of the engine, the controller may be configured to estimate the exhaust gas temperature based on a coolant temperature of the engine, and a temperature of the exhaust pipe of the engine. With this configuration, when fuel cut control is considered, the exhaust gas temperature can accurately be estimated. In this case, when executing the fuel cut control as the control of the engine, the controller may be configured to estimate the exhaust gas temperature in consideration of a flow velocity of the air passing through the exhaust port. This makes it possible to estimate the exhaust gas temperature more accurately.

In the engine device of the present disclosure, the engine may further include a turbocharger having a turbine disposed in an exhaust pipe and a compressor disposed in an intake pipe being coupled through a coupling shaft. When executing fuel cut control that does not perform the fuel injection and the ignition as the control of the engine, the controller may be configured to estimate the exhaust gas temperature based on a coolant temperature of the engine, and the temperature of a turbine housing that houses the turbine. Accordingly, in the configuration where the engine includes a turbocharger, the exhaust gas temperature can accurately be estimated even when the engine is executing the fuel cut control. In this case, when executing the fuel cut control as the control of the engine, the controller may be configured to estimate the exhaust gas temperature in consideration of the flow velocity of the air passing through the exhaust port. This makes it possible to estimate the exhaust gas temperature more accurately.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Now, aspects for carrying out the present disclosure will be described based on an embodiment.

Figure 1:
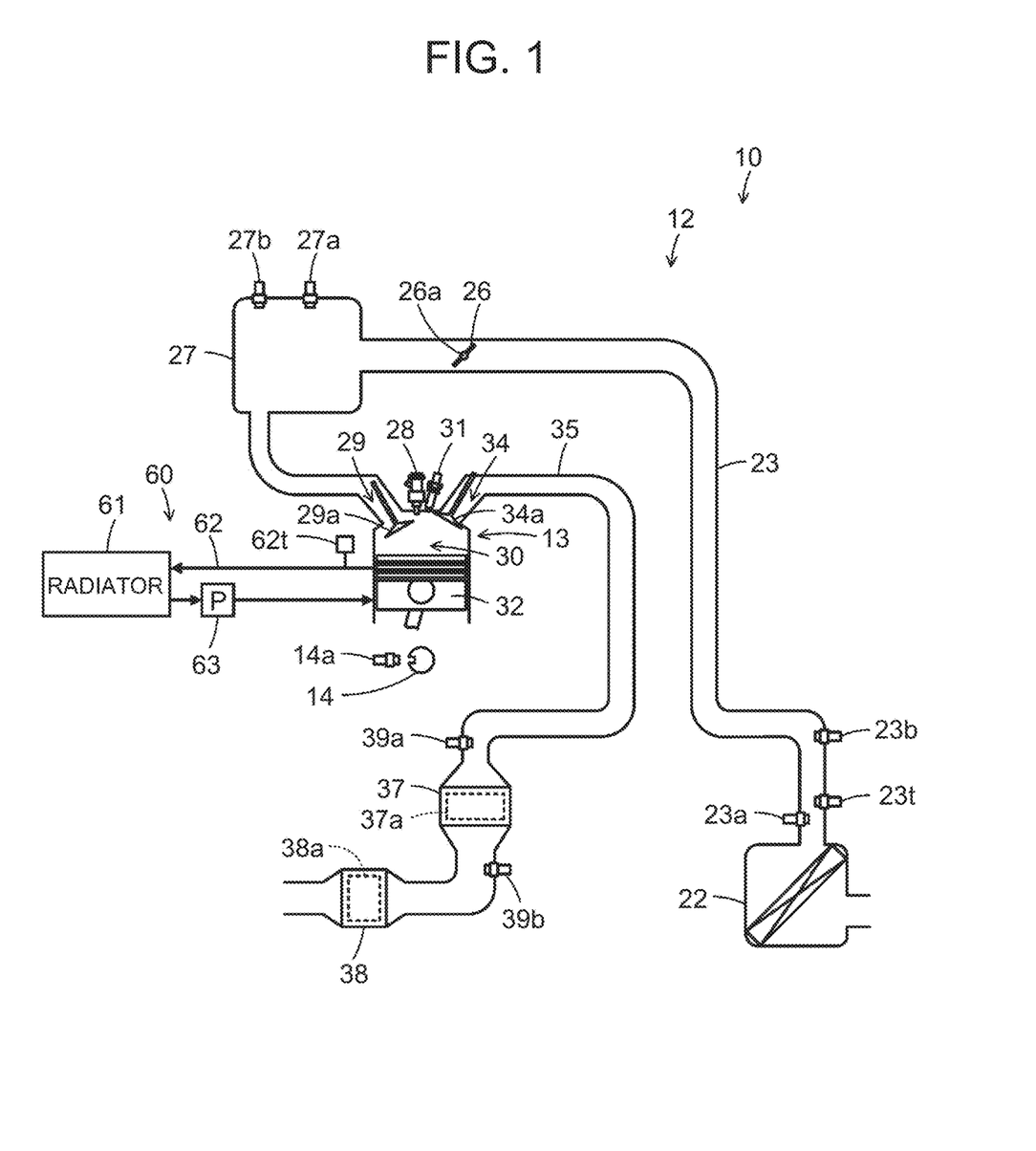
FIG. 1 is a block diagram showing an outlined configuration of an engine device 10 of the present disclosure.
Figure 2:
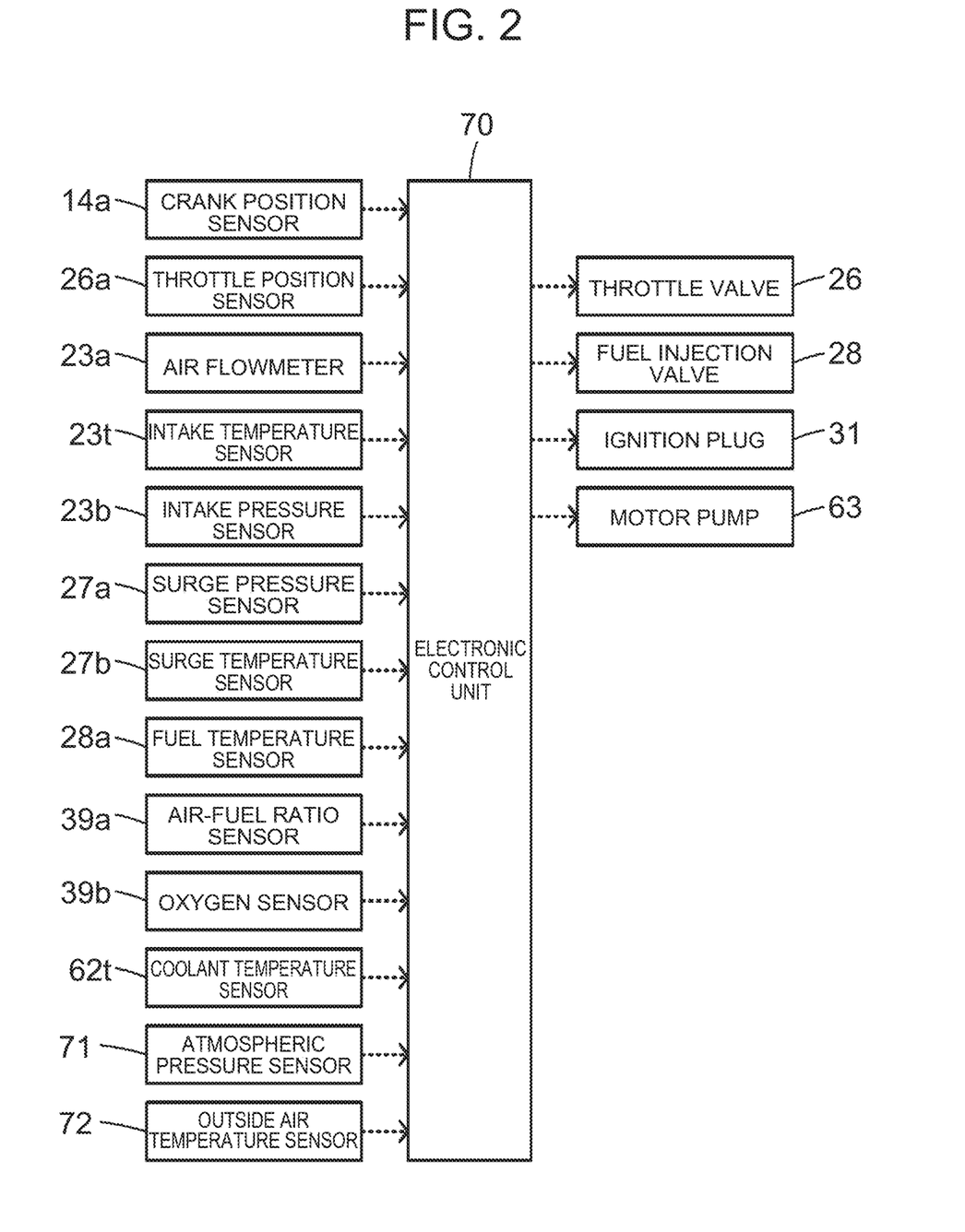
FIG. 2 is an explanatory view showing examples of input output signals of an electronic control unit 70.

FIG. 1 is a block diagram showing an outlined configuration of an engine device 10 of the present disclosure. FIG. 2 is an explanatory view showing examples of input output signals of an electronic control unit 70. The engine device 10 of an embodiment is mounted on general automobiles or various kinds of hybrid automobiles. As shown in FIGS. 1 and 2, the engine device 10 includes an engine 12, a cooling device 60, and an electronic control unit 70 as a controller.

The engine 12 is configured as a multi-cylinder (such as 4-cylinder, and 6-cylinder) internal combustion engine using hydrocarbon fuel, such as gasoline and light oil, to output motive power through four strokes including an intake stroke, a compression stroke, an expansion stroke, and an exhaust stroke. In the engine 12, an air cleaned by an air cleaner 22 is taken into an intake pipe 23, and is allowed to pass through a throttle valve 26 and a surge tank 27 in this order. The air is then guided to an intake port 29 connected to the intake pipe 23. Then, the air is taken into the combustion chamber 30 from the intake port 29 through an intake valve 29a, and is exposed to fuel that is injected from a cylinder injection valve 28 attached to the combustion chamber 30. Accordingly, the air and the fuel are mixed, and combusted by an electric spark provided by an ignition plug 31. The energy of combustion pushes down a piston 32 to cause reciprocating movement, which is converted into rotational movement of a crankshaft 14. Exhaust gas is discharged from the combustion chamber 30 to an exhaust port 34 through an exhaust valve 34a, and is discharged to the ambient air through an exhaust pipe 35 connected to the exhaust port 34. The exhaust pipe 35 is equipped with an exhaust gas control apparatus 37 and an exhaust gas control apparatus 38 provided in this order from an upstream-side. The exhaust gas control apparatuses 37, 38 have catalysts (three-way catalysts) 37a, 38a, respectively, for removing harmful components including carbon monoxides (CO), hydrocarbon (HC), and nitrogen oxides (NOx).

The cooling device 60 cools an engine body 13 of the engine 12. The cooling device 60 includes a radiator 61, a circulation passage 62 of the coolant, and a motor pump 63. The radiator 61 cools the coolant with running wind, an electric fan, or the like. The circulation passage 62 is formed so as to include the radiator 61, a cylinder block, a cylinder head, and the like, of the engine body 13. The motor pump 63 is provided in the circulation passage 62, and pumps the coolant.

The electronic control unit 70 is configured as a microprocessor having a CPU as a main component. The electronic control unit 70 includes, in addition to the CPU, a ROM that stores processing programs, a RAM that temporarily stores data, input-output ports, and a communication port. As shown in FIG. 2, the electronic control unit 70 receives signals from various sensors through the input port.

Examples of the signals input into the electronic control unit 70 may include a crank angle $\theta cr$ from a crank position sensor 14a that detects the rotational position of the crankshaft 14 of the engine 12, and a throttle opening TH from a throttle position sensor 26a that detects the opening degree of the throttle valve 26. Examples of the signals may also include a cam position $\theta ca$ from an unillustrated cam position sensor that detects the rotational position of an intake camshaft which opens and closes the intake valve 29a and the rotational position of an exhaust camshaft which opens and closes the exhaust valve 34a. Examples of the signals may also include an intake air quantity Qin from an air flowmeter 23a attached to the intake pipe 23 on the upstream side of the throttle valve 26, an intake temperature Tin from an intake temperature sensor 23t that is attached to the intake pipe 23 on the upstream-side of the throttle valve 26, and an intake pressure Pin from an intake pressure sensor 23b that is attached to the intake pipe 23 on the upstream-side of the throttle valve 26. Examples of the signals may also include a surge pressure Ps from a surge pressure sensor 27a attached to a surge tank 27, and a surge temperature (temperature of air) Ts from a surge temperature sensor 27b attached to the surge tank 27. Examples of the signals may also include a fuel temperature Tf from a fuel temperature sensor 28a that detects the temperature of fuel supplied to the cylinder injection valve 28. Examples of the signals may also include an air-fuel ratio AF from an air-fuel ratio sensor 39a attached to the exhaust pipe 35 on the upstream-side of the exhaust gas control apparatus 37, and an oxygen signal O2 from an oxygen sensor 39b attached to the exhaust pipe 35 between the exhaust gas control apparatuses 37, 38. Examples of the signals may also include a coolant temperature Tw from a coolant temperature sensor 62t that detects the temperature of the coolant in the circulation passage 62 of the cooling device 60. Examples of the signals may also include an atmospheric pressure Pout from an atmospheric pressure sensor 71, and an outside air temperature Tout from an outside air temperature sensor 72.

The electronic control unit 70 outputs various control signals through the output port. Examples of the signals output from the electronic control unit 70 may include a control signal to the throttle valve 26 of the engine 12, a control signal to the cylinder injection valve 28, and a control signal to the ignition plug 31. Examples of the signals may also include a control signal to the motor pump 63 of the cooling device 60. The electronic control unit 70 calculates a speed Ne of the engine 12 based on the crank angle θcr from the crank position sensor 14a. The electronic control unit 70 also calculates a load ratio (a ratio of the volume of air actually taken in one cycle to a stroke volume of the engine 12 per cycle) KL based on an intake air quantity Qa from the air flowmeter 23a and the speed Ne of the engine 12.

In the thus-configured engine device 10 of the embodiment, the electronic control unit 70 basically executes normal control as control of the engine 12. In the normal control, the electronic control unit 70 performs control such as intake air quantity control that controls the opening degree of the throttle valve 26, fuel injection control that controls the quantity of fuel injection from the cylinder injection valve 28, and ignition control that controls ignition timing of the ignition plug 31, based on a request load factor KL* of the engine 12.

The electronic control unit 70 also executes non-ignition injection control as control of the engine 12, when warm-up of the catalysts 37a, 38a in the exhaust gas control apparatuses 37, 38 is requested in the state where a fuel cut condition is established. The electronic control unit 70 executes the fuel cut control as control of the engine 12, when warm-up of the catalysts 37a and 38a is requested. Examples of the fuel cut condition includes a condition that the accelerator is turned off during travel of a vehicle mounted with the engine device 10. The warm-up of the catalysts 37a, 38a is request when it is assumed that the catalysts 37a, 38a are not activated, such as when the coolant temperature Tw is equal to or less than a threshold Twref. In the non-ignition injection control, the electronic control unit 70 performs injection of a minute quantity of fuel from the cylinder injection valve 28, and does not perform ignition by the ignition plug 31. In the fuel cut control, the electronic control unit 70 performs neither the fuel injection from the cylinder injection valve 28 nor ignition by the ignition plug 31.

Figure 3:
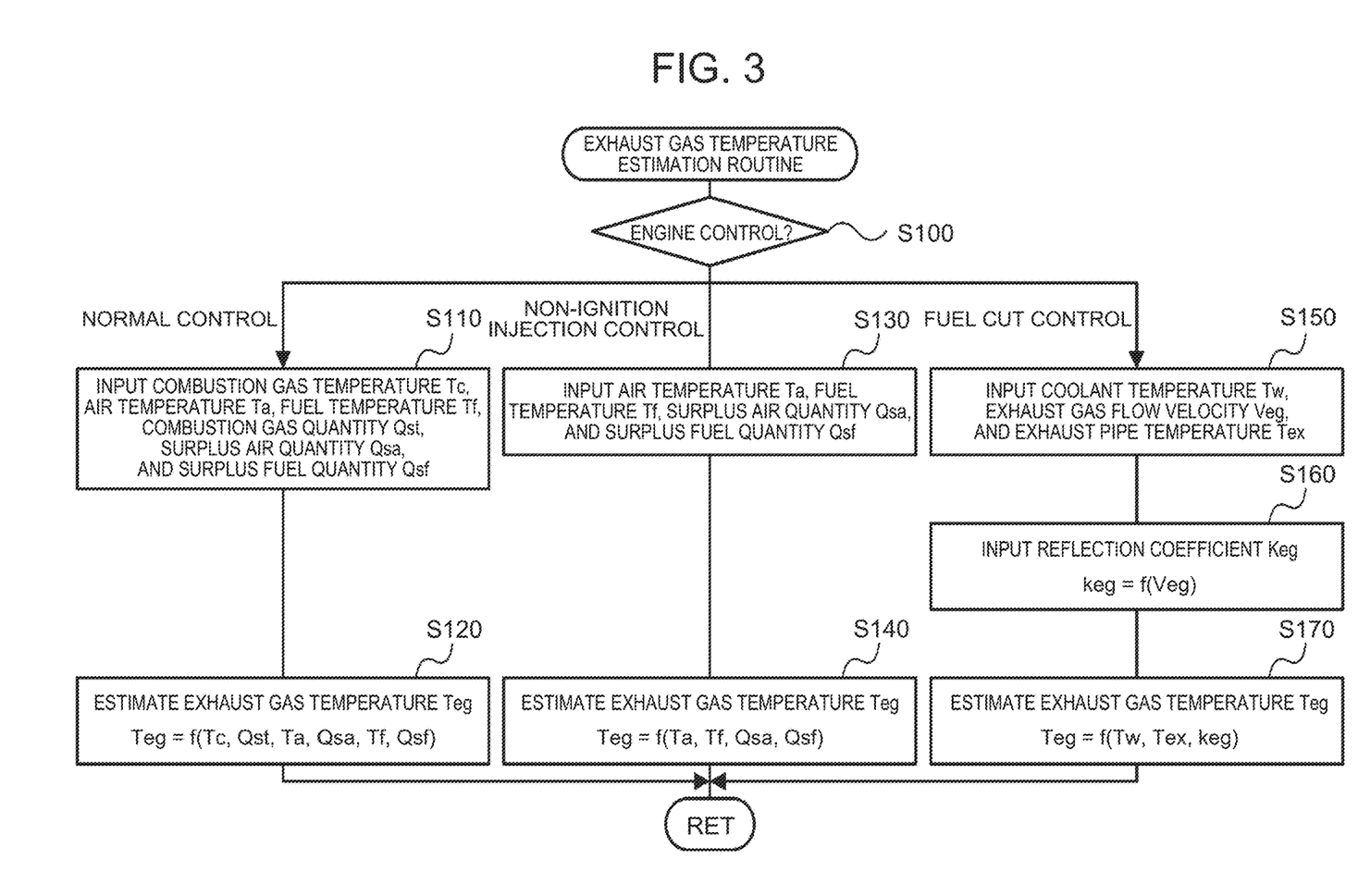
FIG. 3 is a flowchart showing an example of an exhaust gas temperature estimation routine.

Description is now given of operation of the thus-configured engine device 10 of the embodiment, and operation of estimating an exhaust gas temperature Teg in particular. The exhaust gas temperature Teg is a temperature of the exhaust gas (gas including at least one of combustion gas, surplus air, and surplus fuel (surplus evaporated fuel) described later) discharged from the combustion chamber 30 and flowing through the exhaust port 34. FIG. 3 is a flowchart showing an example of an exhaust gas temperature estimation routine which is repeatedly executed by the electronic control unit 70, when normal control or non-ignition injection control is executed as control of the engine 12.

When the exhaust gas temperature estimation routine of FIG. 3 is executed, the electronic control unit 70 first determines which control, out of normal control, non-ignition injection control, and fuel cut control, is executed as control of the engine 12 (step S100). When determining that the normal control is executed as control of the engine 12, the electronic control unit 70 inputs data such as a combustion gas temperature Tc, an air temperature Ta, a fuel temperature Tf, a combustion gas quantity Qst, a surplus air quantity Qsa, and a surplus fuel quantity Qsf (step S110).

Here, the combustion gas temperature Tc is the temperature of combustion gas that is the gas combusted in the combustion chamber 30 and discharged to the exhaust port 34. As the combustion gas temperature Tc, a value estimated based on the speed Ne and the load ratio KL of the engine 12 can be input. The air temperature Ta is the temperature of surplus air that is the air (surplus with respect to the case of the stoichiometric air-fuel ratio) discharged to the exhaust port 34 without contributing to combustion in the combustion chamber 30. As the air temperature Ta, the coolant temperature Tw detected by the coolant temperature sensor 62t can be input. This is because the temperature of air approaches the coolant temperature Tw (temperature of the engine body 13), when the air flows through the intake port 29, the combustion chamber 30, and the exhaust port 34 in this order. The fuel temperature Tf is the temperature of surplus fuel that is the fuel (surplus with respect to the case of the stoichiometric air-fuel ratio) discharged to the exhaust port 34 without contributing to combustion in the combustion chamber 30. As the fuel temperature Tf, a value detected by the fuel temperature sensor 28a can be input.

As the combustion gas quantity Qst, the surplus air quantity Qsa, and the surplus fuel quantity Qsf, values estimated based on the intake air quantity Qin and the fuel injection quantity Qf can be input. The surplus air quantity Qsa takes a positive value in the case of the lean air-fuel ratio, and takes a value zero in the case of the stoichiometric or rich air-fuel ratio. The surplus fuel quantity Qsf takes a positive value in the case of the rich air-fuel ratio, and takes a value zero in the case of the stoichiometric or lean air-fuel ratio.

When data input is performed in this way, the electronic control unit 70 estimates the exhaust gas temperature Teg by an expression (1) using the input parameters including the combustion gas temperature Tc, the combustion gas quantity Qst, the air temperature Ta, the surplus air quantity Qsa, the fuel temperature Tf, and the surplus fuel quantity Qsf (step S120). Then, the electronic control unit 70 ends the present routine. Here, in the expression (1), "Cc" is specific heat of combustion gas, "Ca" is specific heat of air (specific heat of surplus air), "Cf" is specific heat of fuel (specific heat of surplus fuel), and "Lf" is evaporation latent heat of fuel (evaporation latent heat of surplus fuel). In a numerator on the right side of the expression (1), a first term represents thermal energy of combustion gas (first thermal energy), a second term represents thermal energy of surplus air (second thermal energy), and third and fourth terms represent thermal energy of surplus fuel (third thermal energy). In a denominator on the right side of the expression (1), a first term represents thermal capacity of combustion gas (first thermal capacity), a second term represents thermal capacity of surplus air (second thermal capacity), and a third term represents thermal capacity of surplus fuel (third thermal capacity).

[Expression 1]

$$Teg = \frac{Tc \times Qst \times Cc + Ta \times Qsa \times Ca + Tf \times Qsf \times Cf - Qsf \times Lf}{Qst \times Cc + Qsa \times Ca + Qsf \times Cf} \quad (1)$$

In the case of the stoichiometric air-fuel ratio, the surplus air quantity Qsa and the surplus fuel quantity Qsf take a value zero. Hence, the second term, the third term, and the fourth term in the numerator, and the second term and the third term in the denominator on the right side of the expression (1) take a value zero. Therefore, the expression (1) can be expressed as an expression (2). In the case of the lean air-fuel ratio, the surplus fuel quantity Qsf takes a value zero. Hence, the third term and the fourth term in the numerator and the third term in the denominator on the right side of the expression (1) take a value zero, and therefore the expression (1) can be expressed as an expression (3). In the case of the rich air-fuel ratio, the surplus air quantity Qsa takes a value zero. Hence, the second term in the numerator and the second term in the denominator on the right side of the expression (1) take a value zero, and therefore the expression (1) can also be expressed as an expression (4). By estimating the exhaust gas temperature Teg in this way, when the normal control is executed, the exhaust gas temperature Teg can accurately be estimated in the case of the lean and rich air-fuel ratios as well as in the case of the stoichiometric air-fuel ratio.

[Expression 2]

$$Teg = \frac{Tc \times Qst \times Cc}{Qst \times Cc} \quad (2)$$

$$Teg = \frac{Tc \times Qst \times Cc + Ta \times Qsa \times Ca}{Qst \times Cc + Qsa \times Ca} \quad (3)$$

$$Teg = \frac{Tc \times Qst \times Cc + Tf \times Qsf \times Cf - Qsf \times Lf}{Qst \times Cc + Qsf \times Cf} \quad (4)$$

When determining in step S100 that the non-ignition injection control is executed as control of the engine 12, the electronic control unit 70 inputs data such as the air temperature Ta, the fuel temperature Tf, the surplus air quantity Qsa, and the surplus fuel quantity Qsf (step S130). Here, the air temperature Ta and the fuel temperature Tf can be input as in the process of step S110. As the surplus air quantity Qsa, the intake air quantity Qin detected by the air flowmeter 23a can be input. As the surplus fuel quantity Qsf, the fuel injection quantity Qf from the cylinder injection valve 28 can be input. When the non-ignition injection control is executed, combustion does not occur in the combustion chamber 30. Hence, the air taken in the combustion chamber 30 can be regarded as the surplus air, and the fuel injected from the cylinder injection valve 28 can be regarded as the surplus fuel.

When data is input in this way, the electronic control unit 70 estimates the exhaust gas temperature Teg by an expression (5) using input parameters including the air temperature Ta, the surplus air quantity Qsa, the fuel temperature Tf, and the surplus fuel quantity Qsf (step S120). Then, the electronic control unit 70 ends the present routine. Here, the expression (5) is obtained by removing the first term of the numerator and the first term of the denominator on the right side of the expression (1), considering that combustion does not occur in the combustion chamber 30 (thermal energy and thermal capacity of the combustion gas can be set to a value zero) when the non-ignition injection control is executed. Since the exhaust gas temperature Teg is estimated in this way, the exhaust gas temperature Teg can accurately be estimated even when the non-ignition injection control is executed.

[Expression 3]

$$Teg = \frac{Ta \times Qsa \times Ca + Tf \times Qsf \times Cf - Qsf \times Lf}{Qsa \times Ca + Qsf \times Cf} \quad (5)$$

When determining that the fuel cut control is executed as control of the engine 12 in step S100, the electronic control unit 70 inputs data such as a coolant temperature Tw of the engine 12, an exhaust gas flow velocity Veg that is the flow velocity of exhaust gas flowing through the exhaust port 34, and an exhaust pipe temperature Tex that is the temperature of the exhaust pipe 35 (step S150). Here, as the coolant temperature Tw, a value detected by the coolant temperature sensor 62t can be input. As the exhaust gas flow velocity Veg, a value estimated based on the speed Ne of the engine 12 can be input. As the exhaust pipe temperature Tex, a value estimated based on the exhaust gas temperature Teg, the outside air temperature Tout from the outside air temperature sensor 72, and the like, can be input.

Figure 4:
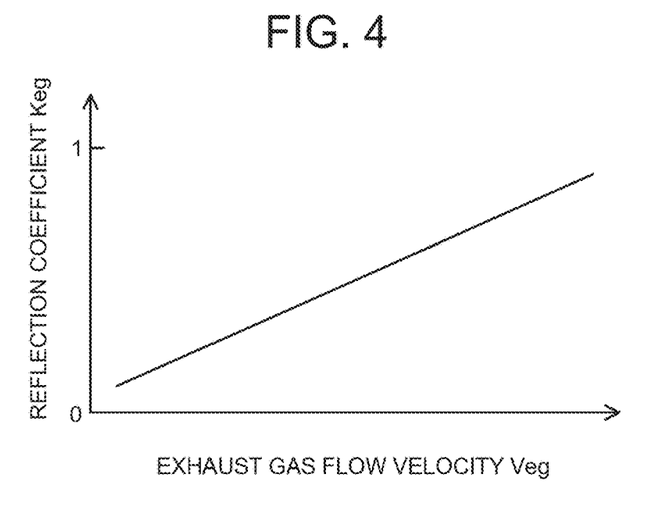
FIG. 4 is an explanatory view showing an example of a reflection coefficient setting map.

Once data is input in this way, the electronic control unit 70 sets a reflection coefficient keg based on the input exhaust gas flow velocity Veg (step S160). Here, the reflection coefficient keg can be set by applying the exhaust gas flow velocity Veg to a reflection coefficient setting map. The reflection coefficient setting map is set in advance as relationship between the exhaust gas flow velocity Veg and the reflection coefficient keg through experiments or analysis. FIG. 4 is an explanatory view showing an example of the reflection coefficient setting map. As shown in FIG. 4, the reflection coefficient keg is set to be larger as the exhaust gas flow velocity Veg is larger in the range larger than a value zero and smaller than a value one. The reason thereof will be described later.

Next, the electronic control unit 70 estimates the exhaust gas temperature Teg by an expression (6) using the coolant temperature Tw, the exhaust pipe temperature Tex, and the reflection coefficient keg (step S170), and then ends the present routine. Here, in the expression (6), the coolant temperature Tw is used because the temperature of air approaches the coolant temperature Tw (temperature of the engine body 13), when the air flows through the intake port 29, the combustion chamber 30, and the exhaust port 34 in this order. The exhaust pipe temperature Tex is used because air receives heat from the exhaust pipe 35 having a large thermal capacity, when flowing through the exhaust port 34. By setting the reflection coefficient keg as described above, the exhaust gas temperature Teg is estimated to be closer to the coolant temperature Tw as the exhaust gas flow velocity Veg is larger. This is because as the exhaust gas flow velocity Veg is larger, the exhaust gas receives less heat quantity from the exhaust pipe 35. By estimating the exhaust gas temperature Teg in this way, the exhaust gas temperature Teg (temperature of the exhaust gas flowing into the exhaust pipe 35 through the exhaust port 34 to be specific) can accurately be estimated even when the fuel cut control is executed.

[Expression 4]

$$Teg = Tex + (Tw - Tex) \times \text{keg} \qquad (6)$$

In the engine device 10 of the embodiment described in the foregoing, when executing normal control as control of the engine 12 in the case of the stoichiometric air-fuel ratio, the electronic control unit 70 estimates the exhaust gas temperature Teg based on the thermal energy of the combustion gas based on the combustion gas temperature Tc, the combustion gas quantity Qst, and the specific heat of combustion gas Cc. When executing normal control in the case of the lean air-fuel ratio, the electronic control unit 70 estimates the exhaust gas temperature Teg based on the thermal energy of combustion gas and thermal energy of surplus air that is based on the air temperature Ta, the surplus air quantity Qsa, and a specific heat of air Ca. When executing the normal control in the case of the rich air-fuel ratio, the electronic control unit 70 further estimates the exhaust gas temperature Teg based on the thermal energy of combustion gas and the thermal energy of the surplus fuel that is based on the fuel temperature Tf, the surplus fuel quantity Qsf, a specific heat of fuel Cf, and an evaporation latent heat of fuel Lf. Accordingly, during execution of the normal control, the exhaust gas temperature Teg can accurately be estimated in the case of the lean and rich air-fuel ratios, as well as in the case of the stoichiometric air-fuel ratio.

Figure 5:
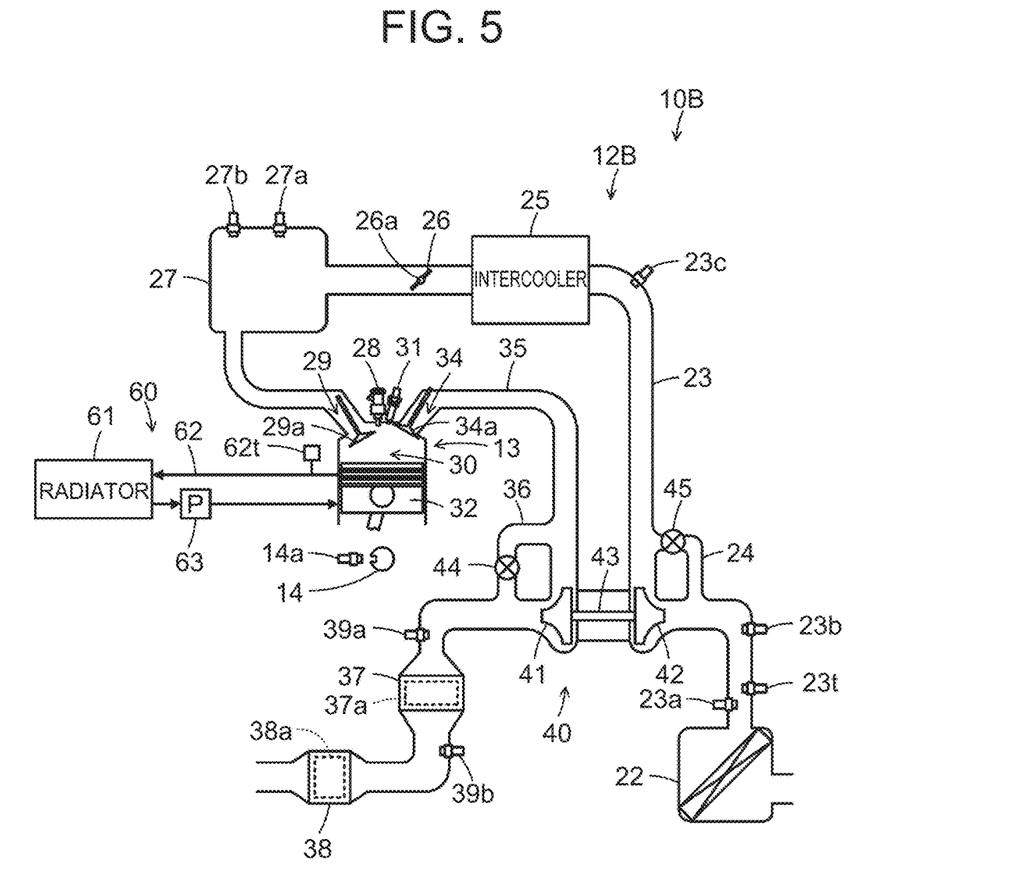
FIG. 5 is a block diagram showing an outlined configuration of an engine device 10B of a modification.
Figure 6:
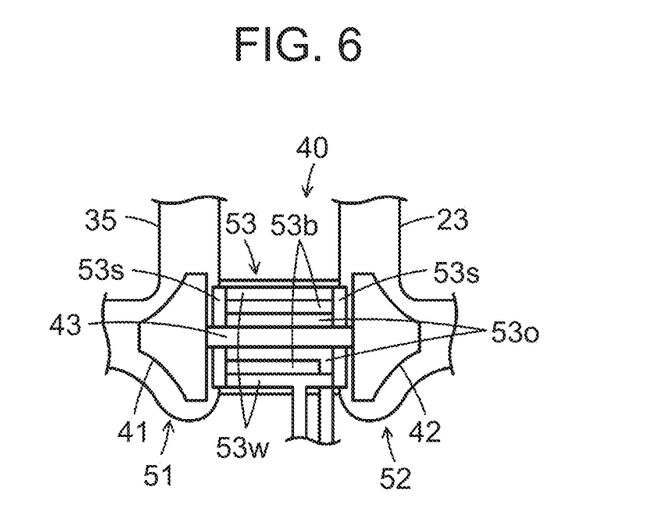
FIG. 6 is a block diagram showing an outlined configuration of a turbocharger 40.
Figure 7:
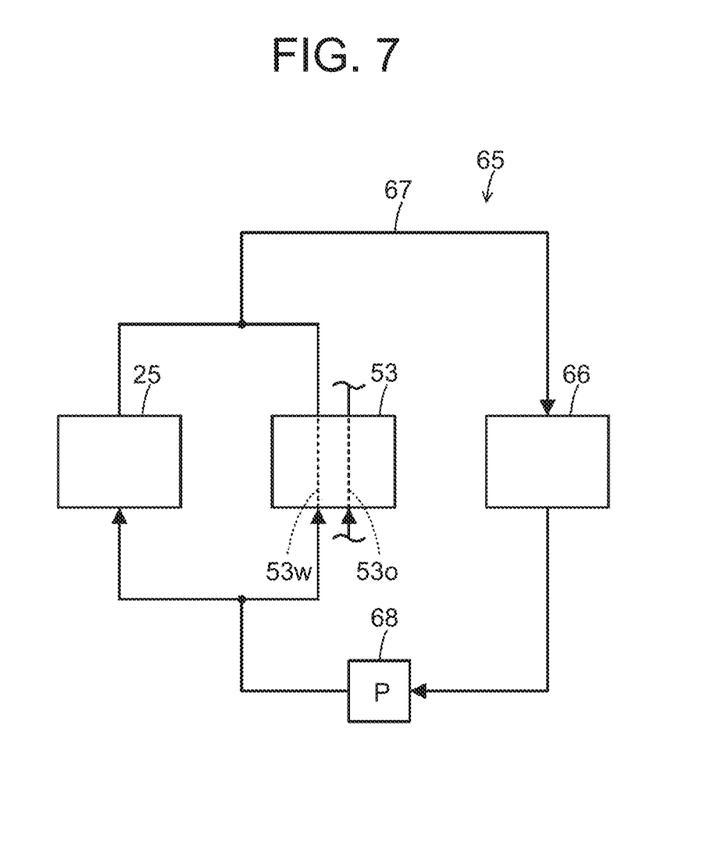
FIG. 7 is a block diagram showing an outlined configuration of a cooling device 65.
Figure 8:
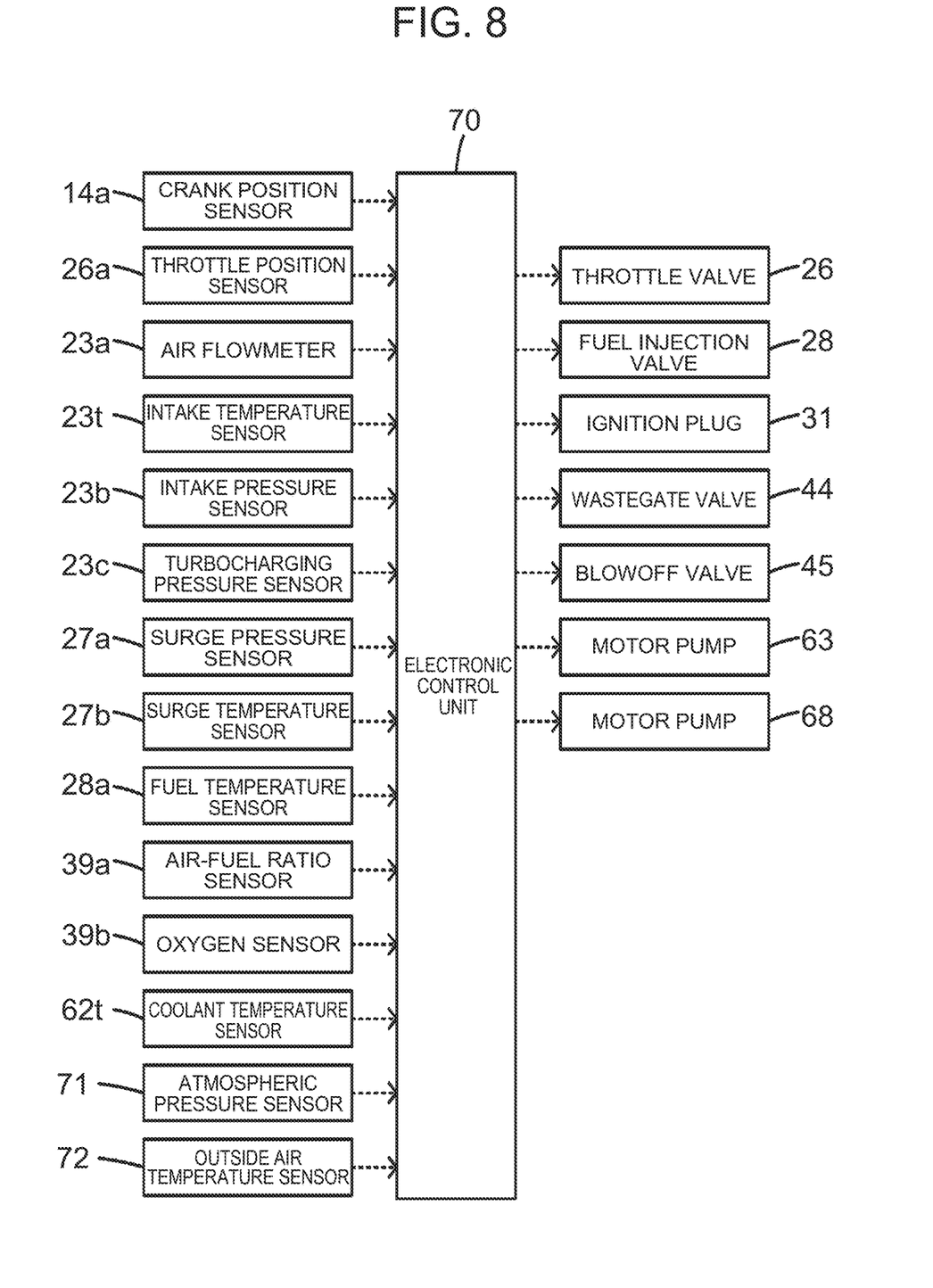
FIG. 8 is an explanatory view showing examples of input output signals of the electronic control unit 70.

In the engine device 10 of the embodiment, the engine 12 does not include a turbocharger. However, the engine 12 may include a turbocharger. FIG. 5 is a block diagram showing an outlined configuration of an engine device 10B of a modification. FIG. 6 is a block diagram showing an outlined configuration of a turbocharger 40. FIG. 7 is a block diagram showing an outlined configuration of a cooling device 65. FIG. 8 is an explanatory view showing examples of the input output signals of the electronic control unit 70.

The engine device 10B including an engine 12B is different from the engine device 10 including the engine 12 shown in FIG. 1 in the point that the engine 12B further includes component members such as the turbocharger 40, an intercooler 25, and the cooling device 65. Hereinafter, the configuration of the engine device 10B different from that of the engine device 10 will be described.

As shown in FIGS. 5 and 6, the turbocharger 40 is configured as a turbocharger including a turbine 41, a compressor 42, a wastegate valve 44, and a blowoff valve 45. The turbine 41 is disposed in the exhaust pipe 35 on the upstream-side of the exhaust gas control apparatus 37. The compressor 42 is disposed in the intake pipe 23 on the upstream-side of the throttle valve 26, and is coupled with the turbine 41 through a coupling shaft 43. Therefore, the compressor 42 is driven by the turbine 41. The wastegate valve 44 is provided in a bypass pipe 36 that connects an upstream portion and a downstream portion of the exhaust pipe 35 which are on the upstream side and the downstream side of the turbine 41, respectively. The electronic control unit 70 controls the wastegate valve 44. The blowoff valve 45 is provided in a bypass pipe 24 that connects an upstream portion and a downstream portion of the intake pipe 23 which are on the upstream side and upstream side of the compressor 42, respectively. The electronic control unit 70 controls the blowoff valve 45.

The turbine 41 is disposed in a turbine housing 51 of the exhaust pipe 35. The compressor 42 is housed in a compressor housing 52 of the intake pipe 23. The coupling shaft 43 is disposed in a shaft housing 53 connected to the turbine housing 51 and the compressor housing 52. The coupling shaft 43 is rotatably supported by the shaft housing 53 through a bearing 53b. A boundary portion between the turbine housing 51 and the shaft housing 53, and a boundary portion between the compressor housing 52 and the shaft housing 53 are each equipped with a seal ring 53s. In the shaft housing 53, a passage 53w included in a circulation passage 67 of a coolant of the cooling device 65 and an oil passage 53o that allows lubricating oil to flow are also formed.

In the turbocharger 40, the opening degree of the wastegate valve 44 is adjusted for adjusting a distribution ratio between the quantity of exhaust gas flowing through the bypass pipe 36 and the quantity of exhaust gas flowing through the turbine 41, adjusting the rotational driving force of the turbine 41, adjusting the quantity of air compressed by the compressor 42, and adjusting a turbocharging pressure (intake pressure) of the engine 12. Here, the distribution ratio is adjusted such that as the opening degree of the wastegate valve 44 is smaller, the exhaust quantity flowing through the bypass pipe 36 is made smaller and the exhaust quantity flowing through the turbine 41 is made larger. When the wastegate valve 44 is fully opened, the engine 12 operates like a natural intake type engine that does not include the turbocharger 40.

In the turbocharger 40, when the blowoff valve 45 is opened in the state where the pressure of the intake pipe 23 that is on the downstream side of the compressor 42 is larger to some extent than the pressure of the intake pipe 23 that is on the upstream-side of the compressor 42, the surplus pressure that is on the downstream side of the compressor 42 can be released. The blowoff valve 45 may be configured as a check valve in place of the valve controlled by the electronic control unit 70. The check valve is opened when the pressure of the intake pipe 23 that is on the downstream side of the compressor 42 becomes larger to some extent than the pressure of the intake pipe 23 that is on the upstream side of the compressor 42.

The intercooler 25 is disposed in the intake pipe 23 between the compressor 42 and the throttle valve 26. As shown in FIG. 7, the cooling device 65 cools the intercooler 25 and the shaft housing 53 of the turbocharger 40. The cooling device 65 includes a radiator 66, the circulation passage 67 of the coolant, and a motor pump 68. The radiator 66 cools the coolant with running wind, an electric fan, or the like. The circulation passage 67 is formed to include the radiator 66, the intercooler 25, and the passage 53w in the shaft housing 53 of the turbocharger 40 (see FIGS. 6 and 7). The motor pump 68 is provided in the circulation passage 67 to pump the coolant.

As shown in FIG. 8, examples of the signals input into the electronic control unit 70 may include the same signals as in the engine device 10. In addition, the examples of the signals may include a turbocharging pressure Pc from a turbocharging pressure sensor 23c that is attached to the intake pipe 23 between the compressor 42 and the intercooler 25. The examples of the signals output from the electronic control unit 70 may include, in addition to the same signals as in the engine device 10, a control signal to the wastegate valve 44, a control signal to the blowoff valve 45, and a control signal to the motor pump 68 of the cooling device 65.

In the thus-configured engine device 10B of the modification, when executing normal control as control of the engine 12, the electronic control unit 70 performs intake air quantity control, fuel injection control, and ignition control, and additionally performs turbocharging control that controls the opening degree of the wastegate valve 44, based on the required load factor KL* of the engine 12. As described before, when the wastegate valve 44 is fully opened, the engine 12 operates like a natural intake type engine that does not include the turbocharger 40.

Figure 9:
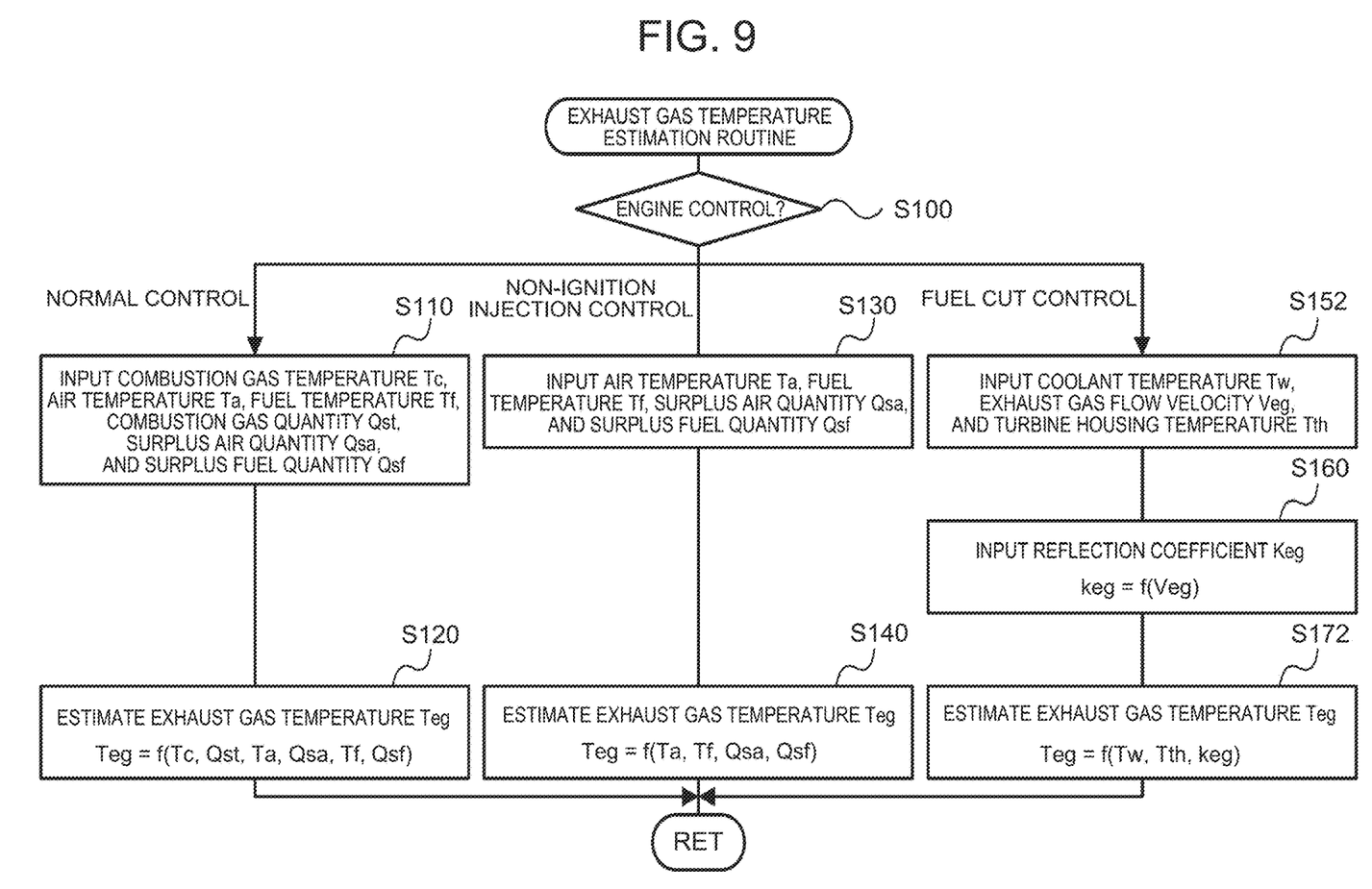
FIG. 9 is a flowchart showing an example of an exhaust gas temperature estimation routine.

In the engine device 10B of the modification, the electronic control unit 70 executes an exhaust gas temperature estimation routine of FIG. 9 in place of the exhaust gas temperature estimation routine of FIG. 3. The exhaust gas temperature estimation routine of FIG. 9 is different from the exhaust gas temperature estimation routine of FIG. 3 in the point that the processes of steps S150, S170 are replaced with processes of steps S152, S172. Hereinafter, description is given of the configuration of the exhaust gas temperature estimation routine of FIG. 9 different from the configuration of the exhaust gas temperature estimation routine of FIG. 3.

In the exhaust gas temperature estimation routine of FIG. 9, when determining that the fuel cut control is executed as control of the engine 12 in step S100, the electronic control unit 70 inputs the coolant temperature Tw and the exhaust gas flow velocity Veg as in the process of step S150, and also inputs, in place of the exhaust pipe temperature Tex that is the temperature of the exhaust pipe 35, a turbine housing temperature Ttb that is the temperature of the turbine housing 51 (step S152). Here, as the here turbine housing temperature Ttb, a value estimated based on the exhaust gas temperature Teg, the outside air temperature Tout from the outside air temperature sensor 72, and the like, can be input.

In step S160, the electronic control unit 70 sets the reflection coefficient keg. The electronic control unit 70 estimates the exhaust gas temperature Teg by an expression (7) using the coolant temperature Tw, the exhaust pipe temperature Tex, and the reflection coefficient keg (step S172), and then ends the present routine. Here, the expression (7) is different from the expression (6) in the point that the exhaust pipe temperature Tex is replaced with the turbine housing temperature Tth. In the expression (7) the turbine housing temperature Tth is used in place of the exhaust pipe temperature Tex, because when the engine includes the turbocharger 40, the influence by the thermal capacity of the turbine housing 51 is generally larger than the influence by the thermal capacity of the exhaust pipe 35, and therefore when air flows through the exhaust port 34, the air tends to receive more heat from the turbine housing 51 than from the exhaust pipe 35. By estimating the exhaust gas temperature Teg in this way, even when the fuel cut control is executed in the engine including the turbocharger 40, the exhaust gas temperature Teg (temperature of the exhaust gas flowing into the turbine 41 through the exhaust port 34 to be specific) can accurately be estimated.

[Expression 5]

$$Teg = Tth + (Tw - Tex) \times keg \qquad (7)$$

The engine device 10B of the modification is configured to include the cooling device 60, and the cooling device 65. The cooling device 60 includes the circulation passage 62 formed to include a cylinder block, a cylinder head, and the like, of the engine body 13. The cooling device 65 includes the circulation passage 67 formed to include the intercooler 25 and the passage 53w in the shaft housing 53 of the turbocharger 40. However, the engine device 10B may include, in place of the cooling devices 60, 65, a cooling device having a circulation passage formed to include both the circulation passage 62 and the circulation passage 67.

In the engine device 10B of the modification, the turbocharger 40 is configured as a turbocharger in which the turbine 41 disposed in the exhaust pipe 35 and the compressor 42 disposed in the intake pipe 23 are coupled through the coupling shaft 43. However, the turbocharger 40 may be configured as a supercharger in which a compressor driven by the engine 12 or the motor is disposed in the intake pipe 23. When the turbocharger 40 is configured as a supercharger, the turbine housing 51 (turbine 41) is not disposed in the exhaust pipe 35. In this case, the exhaust gas temperature estimation routine of FIG. 3 may be executed instead of the exhaust gas temperature estimation routine of FIG. 9. When fuel cut control is executed, the exhaust gas temperature Teg may be estimated based on the exhaust pipe temperature Tex.

In the engine device 10 of the embodiment and the engine device 10B of the modification, when the fuel cut control is executed, the exhaust gas temperature Teg is estimated using the reflection coefficient keg based on the exhaust gas flow velocity Veg. However, in this case, the exhaust gas temperature Teg may be estimated using a fixed reflection coefficient keg without taking into consideration the exhaust gas flow velocity Veg.

In the engine device 10 of the embodiment and the engine device 10B of the modification, the exhaust pipe temperature Tex and the turbine housing temperature Tth are estimated based on the exhaust gas temperature Teg, or the like. However, the exhaust pipe 35 and the turbine housing 51 may be equipped with temperature sensors, and the exhaust pipe temperature Tex and the turbine housing temperature Tth may be detected with these temperature sensors.

In the embodiment, the engine device 10 is mounted on general automobiles or various kinds of hybrid automobiles. However, the engine device 10 may be mounted on vehicles other than the automobiles, or may be mounted in stationary equipment, such as construction equipment.

Description is given of correspondence relation between the main elements of the embodiment and the main elements of the present disclosure described in Summary. In the embodiment, the engine 12 corresponds to the "engine", and the electronic control unit 70 corresponds to the "control device".

Since the correspondence relation between the main elements of the embodiment and the main elements of the present disclosure described in Summary is merely an example for specific description of the aspect for carrying out the present disclosure described in Summary, the correspondence relation is not intended to limit the elements of the present disclosure described in Summary More specifically, the present disclosure disclosed in Summary should be interpreted based on the description therein, and the embodiments are merely specific examples of the present disclosure disclosed in Summary Although the aspects for carrying out the present disclosure have been described using the embodiments, an applicable embodiment of the present disclosure is not limited in any manner to the embodiments disclosed. It should naturally be understood that the present disclosure can be carried out in various aspects without departing from the scope of the present disclosure.

The present disclosure is applicable in the fields such as manufacturing of engine devices.

What is claimed is:

1. An engine device, comprising
an engine including
an intake port,
a combustion chamber, and
an exhaust port; and
a controller configured to control the engine and estimate an exhaust gas temperature that is a temperature of exhaust gas discharged from the combustion chamber and flowing through the exhaust port, wherein
when executing normal control that performs fuel injection and ignition as control of the engine, the controller is configured to
estimate the exhaust gas temperature based on first thermal energy in a case of a stoichiometric air-fuel ratio, the first thermal energy being based on a combustion gas temperature, a combustion gas quantity, and specific heat of combustion gas,
estimate the exhaust gas temperature based on the first thermal energy and second thermal energy in a case of a lean air-fuel ratio, the second thermal energy being based on an air temperature, a surplus air quantity with respect to the case of the stoichiometric air-fuel ratio, and specific heat of air, and
estimate the exhaust gas temperature based on the first thermal energy and third thermal energy in a case of a rich air-fuel ratio, the third thermal energy being based on a fuel temperature, a surplus fuel quantity with respect to the case of the stoichiometric air-fuel ratio, specific heat of fuel, and evaporation latent heat of fuel.

2. The engine device according to claim 1, wherein when executing the normal control as the control of the engine, the controller is configured to
estimate the exhaust gas temperature by dividing the first thermal energy by first thermal capacity in the case of the stoichiometric air-fuel ratio, the first thermal energy being obtained as a product of the combustion gas temperature, the combustion gas quantity, and the specific heat of combustion gas, the first thermal capacity being obtained as a product of the combustion gas quantity and the specific heat of combustion gas,
estimate the exhaust gas temperature by dividing a sum of the first thermal energy and the second thermal energy by a sum of the first thermal capacity and second thermal capacity in the case of the lean air-fuel ratio, the second thermal energy being obtained as a product of the air temperature, the surplus air quantity, and the specific heat of air, the second thermal capacity being obtained as a product of the surplus air quantity and the specific heat of air, and
estimate the exhaust gas temperature by dividing a sum of the first thermal energy and the third thermal energy by a sum of the first thermal capacity and third thermal capacity in the case of the rich air-fuel ratio, the third thermal energy being obtained by subtracting a product of the surplus fuel quantity and the evaporation latent heat of fuel from a product of the fuel temperature, the surplus fuel quantity, and the specific heat of fuel, the third thermal capacity being obtained as a product of the surplus fuel quantity and the specific heat of fuel.

3. The engine device according to claim 1, wherein when executing non-ignition injection control that performs the fuel injection without performing the ignition as the control of the engine, the controller is configured to estimate the exhaust gas temperature based on the second thermal energy and the third thermal energy, the second thermal energy being obtained by using the quantity of air passing through the combustion chamber and flowing to the exhaust port as the surplus air quantity, the third thermal energy being obtained by using the fuel injection quantity as the surplus fuel quantity.

4. The engine device according to claim 3, wherein when executing the non-ignition injection control as the control of the engine, the controller is configured to estimate the exhaust gas temperature by dividing a sum of the second thermal energy and the third thermal energy by a sum of the second thermal capacity and the third thermal capacity, the second thermal energy being obtained as a product of the air temperature, the surplus air quantity, and the specific heat of air, the third thermal energy being obtained by subtracting a product of the surplus fuel quantity and the evaporation latent heat of fuel from a product of the fuel temperature, the surplus fuel quantity, and the specific heat of fuel, the second thermal capacity being obtained as a product of the surplus air quantity and the specific heat of air, the third thermal capacity being obtained as a product of the surplus fuel quantity and the specific heat of fuel.

5. The engine device according to claim 1, wherein when executing fuel cut control that does not perform the fuel injection and the ignition as the control of the engine, the controller is configured to estimate the exhaust gas temperature based on a coolant temperature of the engine, and a temperature of the exhaust pipe of the engine.

6. The engine device according to claim 1, wherein:
the engine further includes a turbocharger having a turbine disposed in an exhaust pipe and a compressor disposed in an intake pipe being coupled through a coupling shaft; and
when executing fuel cut control that do not perform the fuel injection and the ignition as the control of the engine, the controller is configured to estimate the exhaust gas temperature based on a coolant temperature of the engine, and a temperature of a turbine housing that houses the turbine.

7. The engine device according to claim 5, wherein when executing the fuel cut control as the control of the engine, the controller is configured to estimate the exhaust gas temperature in consideration of a flow velocity of air passing through the exhaust port.

* * * * *